Inventor
Kakuji Naito

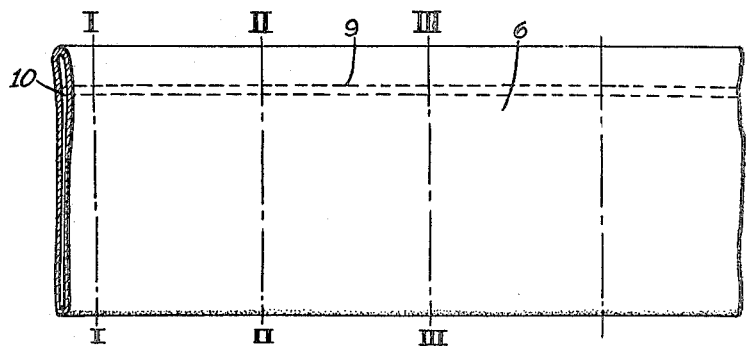

United States Patent Office 3,291,177
Patented Dec. 13, 1966

3,291,177
METHOD AND STRUCTURE FOR RECLOSABLE CONTAINERS
Kakuji Naito, Kawasaki-shi, Japan, assignor to Kabushiki Kaisha Seisan Nikon Sha, Tokyo, Japan, a corporation of Japan
Application Oct. 23, 1963, Ser. No. 325,197, now Patent No. 3,246,672, which is a division of application Ser. No. 89,540, Feb. 15, 1961. Divided and this application Nov. 17, 1965, Ser. No. 508,270
Claims priority, application Japan, Apr. 11, 1960, 35/21,148, 35/21,149; June 3, 1960, 35/26,770
6 Claims. (Cl. 150—3)

This application is a division of application Serial Number 325,197, filed October 23, 1963, now Patent Number 3,246,672, which is a division of application number 89,540, filed February 15, 1961.

This invention relates to bags made of synthetic resin, wherein have been formed integral with the bag material at the inner surface of the bag mouth vis-a-vis each other, a male rib and a female rib which are provided as to be occlusive with respect to each other.

In making the tubular bag material, the bag material is molded into a long continuous tube, which is obtained by extruding from a conventional extruder a synthetic resin under heated state upward through an annular extrusion gap to form continuously a tubular body in which are formed by means of incision-like molding grooves provided in a section of the annular extrusion gap simultaneously in the inner surface thereof raised male and female ribs parallel with the line of generation of the tubular body. Then, in transporting this while clasped in a state of flatness by means of a pair of rolls provided at the top of the apparatus, air is first blown from the aforesaid molding mold into the tubular bag body to maintain the same in a swelled state between the mold and the aforesaid rolls and by concurrently blowing in cold air uniformly from air inlet pipes surrounding the tubular body against the tubular body maintained in the swelled state the film is cooled uniformly. The tubular body is then guided for engaging the occludent means.

The bag material which is now flat and maintaining its occluded state can be finished into individual bags by cutting followed by sealing the cut edges. In actual practice, however, owing to the necessity of accomplishing printing of such as trademarks, tradenames, etc. on the bag surface, the bag material that has been formed in a flat and continuous state, as described hereinabove, is first wound up on a reel, transferred to the printing step where after printing it is rewound on the reel and thereafter cut and the cut edges simultaneously sealed.

The mode of practicing the invention will be described concretely below with reference to the accompanying drawings, in which:

FIG. 1 is a detailed front elevation of that section of a mechanism which continuously molds the bag material;

FIG. 2 is a top plan view of a mold section for making the bag material;

FIG. 3 is a cross-sectional view of the bag material taken along lines III—III of FIG. 1;

FIG. 4 is a top plan view showing the bag material subsequent to its having been occluded;

Figure 10:
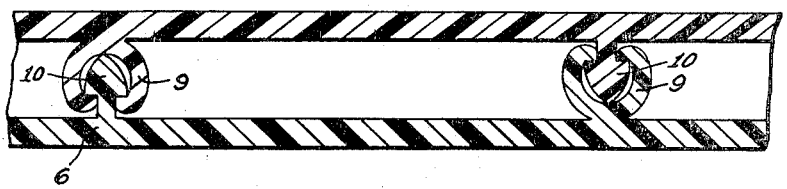
FIG. 10 is an enlarged detailed fragmentary sectional view of the interlocking occludent means.

As shown in FIGURES 1 and 2 an outer mold 1 has a core 3 with a shaped narrow annular extrusion gap 2 therebetween. Plastic is forced through the gap 2 by extruder mechanism not shown, and air introduced into a tube extruded through the gap 2 through a pipe 4. As illustrated the gap is preferably of uniform width to form a tube of film of uniform thickness. There are formed molding grooves 7 and 8 in the outer surface of the core 3 communicating with the extrusion gap 2 for forming male and female ribs 9 and 10 integrally with the bag body 6.

Directly above this mold (FIG. 1) there is provided a pair of delivery rolls 11, 11 disposed in lateral fashion facing each other for clasping and delivering in a flat state the tubular bag body 6 that is extruded from the mold. Air is blown in small amounts into the tubular bag body 6 from the bottom through the aforesaid air inlet pipe 4, with the top part of the bag body 6 being held together by means of the delivery rolls 11, 11. The bag body 6 is swelled or inflated and maintained in a tubular shape. Below the rolls 11, 11 there is provided a pair of guide plates 12, 12 facing each other in roof fashion whereby the shoulder portion of the bag body 6 swelled into a tubular shape is guided and is gradually pressed flat as shown in FIG. 1 and passes between the rolls 11, 11.

At that part of the apparatus where the tubular bag body 6 ascends, a cold air discharge section, not shown, is provided. Air is appropriately supplied and is blown against the outer surface of the bag body 6 to remove heat from the freshly molded film and thus cool the same.

The interlocking elements 9 and 10 are aligned and interlocked to hold the opposed sides of tube material together. The bag body 6 is thus molded into a flat belt-like shape. In actual practice, however, since in most cases printing of such as trademarks, tradenames, etc. are accomplished, it is perhaps convenient to first wind up the bag material in this state by guiding the same to a windup reel.

Figure 7:
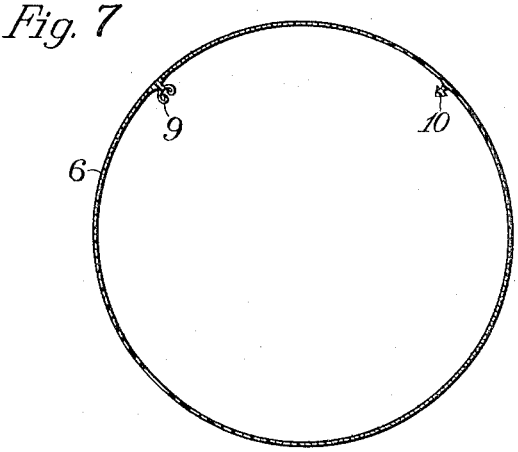
FIG. 7 is an enlarged view in section showing a modification of the occluding ribs.
Figure 8:
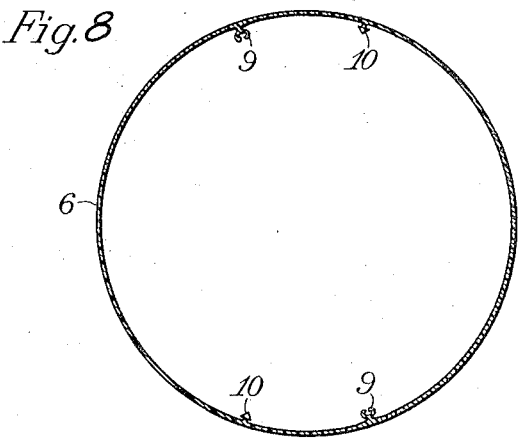
FIG. 8 is a cross-sectional view showing the bag material in which two sets of occluding ribs have been formed.
Figure 9:
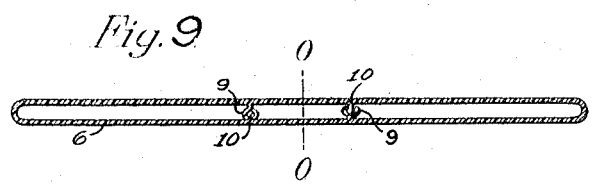
FIG. 9 is a cross-sectional view similar to FIG. 8 but showing the bag material in its flattened form, and line 0—0 designating the location where it is to be cut longitudinally of the tube.

In the hereinabove-described apparatus, the cross-sectional shape of the male and female ribs suitable for occlusion of the bag body 6 can be obtained by suitably designing the configuration of the molding grooves 7, 8. The cross-sectional shape of these male and female elements 9, 10 may be suitably determined in accordance with the uses to which the bags are to be put. For example, as shown in FIG. 7, for a container to be used for fine powders the ribs may be so formed so that the labial section of the female rib 9 is turned inward along the length of the rib while the male rib 10 is formed arrowhead shaped. In addition, regardless of the shapes of the male and female ribs, when two sets thereof are formed facing each other, as illustrated in FIG. 8, and subsequently cut along line 0—0 midway between the two when the bag body has been flattened as in FIG. 9, two bags are obtainable at the same time. FIG. 10 shows the rib and groove elements 9 and 10 in greater detail.

As shown in the drawings the male and female elements of each set thereof are spaced apart from each other in both circumferential directions or, in other words, are spaced apart from each other in both directions relative to the tube circumference. For example, in FIGURE 3 the male element 10 is spaced from the female element 9 in a clockwise direction from element 10 around the circumference of the tube as well as in a counterclockwise direction.

The incisions 7 and 8, which constitute a set of the molding grooves are incised in a part of the circumference of the core 3 with the shape of the grooves being of a wide variety. Since their positions will be determined by the size of the mold, by providing molding plates for the core of the same size having a wide variety of incisions and selectively using the same, it becomes possible to form ribs of any desired shape.

The bag body that has been molded as described hereinbefore is then processed further in the following manner. First, the male and female ribs that have been formed integrally in the bag body are occluded, then after flattening, to the surface of the bag body is imparted, if required, the desired printing and thereafter by using an apparatus to be described hereinafter the bag body is cut into the individual bag and simultaneously therewith the cut edges of the bags are heat sealed.

Figure 5:
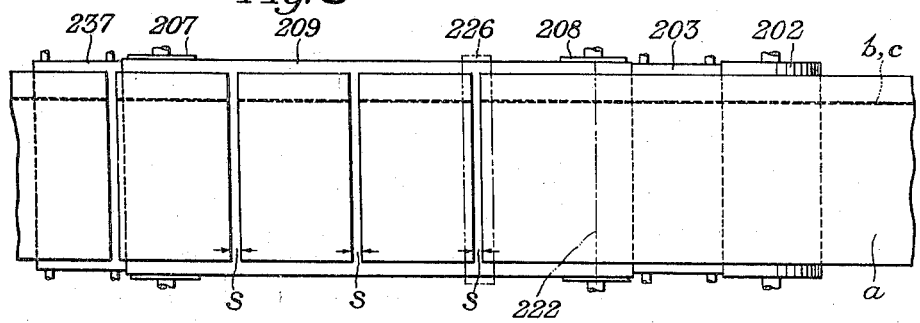
FIG. 5 is a top plan view showing separate bags formed on a conveyor belt after having been cut from the tube material and cross sealed.

In a position forward of a belt 203, rollers 207, 208 are disposed longitudinally, around which an endless conveyor belt 209 is mounted. The tip of the bag body 6 which is delivered forth, FIGURE 5, is made to be transferred smoothly from the belt 203 to the radially moving part of the conveyor belt 209. The surface of this conveyor belt 209 has a layer such as silicon rubber so that the bag body does not stick to the surface of the conveyor belt as a result of operations such as cutting and heat sealing. In addition, by suitable determination of the rotating speed of the rollers 207, 208, the rate of travel of the conveyor belt 209 is made to be greater than that of the bag body 6. An electro-thermic means is provided, which makes possible simultaneously with the cutting of the bag body the heat sealing of the cut edges. A pressure plate 226 is provided. The individual bags are severed and sealed as shown in the copending application Serial 89,540. Further, at 237 is a set of superposed belts that have been provided forward of the conveyor belt 209 and have been provided for the purpose of removing the bags that have been conveyed by the conveyor belt 209.

When the continuous tube is cut into predetermined widths starting at one end and the cut edges thereof are heat sealed, as a result of the fact that a unit width of a bag body leaves the bag body material and is placed independently upon the top of the conveyor belt 209, the cut edges become spaced apart automatically from each other for an S distance.

Figure 6:
FIG. 6 is an enlarged view in section of the resultant synthetic resin bag.

In using these bags, by cutting the bags at the top $f$, FIG. 6, and opening up the engagement of the male and female ribs, the bag is ready to be filled with whatever it is to be filled with. After the bags are filled the male and female ribs 9, 10 are again occluded, and if necessary, the mouth which was opened by cutting may be again sealed using a heat sealer.

While the invention has been described with particular reference to specific embodiments, it is to be understood that it is not to be limited thereto, but that changes may be made therein without departing from the scope of the invention which is defined in the appended claims.

I claim:
1. A structure for a reclosable container comprising, a flexible closed integral one-piece tube of a flexible plastic film,
cross-seals at the ends of said tube forming a closed bag,
first and second interlocking elements integral with and one piece with the tube on the inner surface thereof shaped for cooperative pressure engagement and for forcible separation,
said elements spaced apart from each other in both circumferential directions,
said film including a body forming sheet portion between the interlocking elements at one side of the first element for forming the body of the bag,
and said film including a flange forming sheet portion between the interlocking elements at the other side of said first element with said flange portion extending over the top of the bag and adapted to be severed for access to the bag and providing separate opening gripping flanges for the elements.

2. A structure for a reclosable container comprising, a flexible closed integral one-piece tube of a flexible plastic film with the axis of the tube extending laterally of a bag formed from the tube and the circumference of the tube extending to form the front and back of the bag,
cross-seals at the ends of said tube forming sides for the bag,
first and second interlocking elements integral with and of one piece with the tube on the inner surface thereof with the ends of said elements extending to the sides of the bag and being shaped for cooperative pressure interlocking engagement and for forcible separation,
said elements spaced apart from each other in both directions relative to the tube circumference, said film including a body forming sheet portion between the interlocking elements extending downwardly at one side of the first element to the second element for forming the body of the bag, and said film including a flange forming sheet portion between the interlocking elements extending upwardly at the other side of said first element to the second element with said flange portion extending over the top of the bag and adapted to be severed for access to the bag and providing separate opening gripping flanges for the elements.

3. A structure for a reclosable container in accordance with claim 2 wherein said first interlocking element is arrowhead shaped in cross-section and said second interlocking element is substantially complementary shaped to form a groove to embrace and interlock with said first element.

4. A structure for a reclosable container in accordance with claim 2 wherein said flexible plastic film is of substantially uniform thickness for said flange portion and for said body portion.

5. A structure for a reclosable container in accordance with claim 2 wherein said cross-seals are formed by heat and weld the film at the ends of the tube together.

6. A structure for a reclosable container in accordance with claim 2 wherein said first and second elements are normally interlocked before severing said flange portion to provide the separate gripping flanges.

References Cited by the Examiner
UNITED STATES PATENTS

| | | | |
|---|---|---|---|
| 2,674,289 | 4/1954 | Silverman | 150—3 |
| 2,878,849 | 3/1959 | Lingenfelter et al. | 150—3 |
| 2,916,197 | 12/1959 | Detrie et al. | 206—47 X |

FOREIGN PATENTS

| | | |
|---|---|---|
| 1,031,136 | 3/1953 | France. |
| 284,060 | 11/1952 | Switzerland. |

FRANKLIN T. GARRETT, *Primary Examiner.*

JOSEPH R. LECLAIR, *Examiner.*

M. L. MINSK, *Assistant Examiner.*